Dec. 8, 1925.
1,564,867
J. M. LINDMARK
VEHICLE WHEEL
Filed March 2, 1925
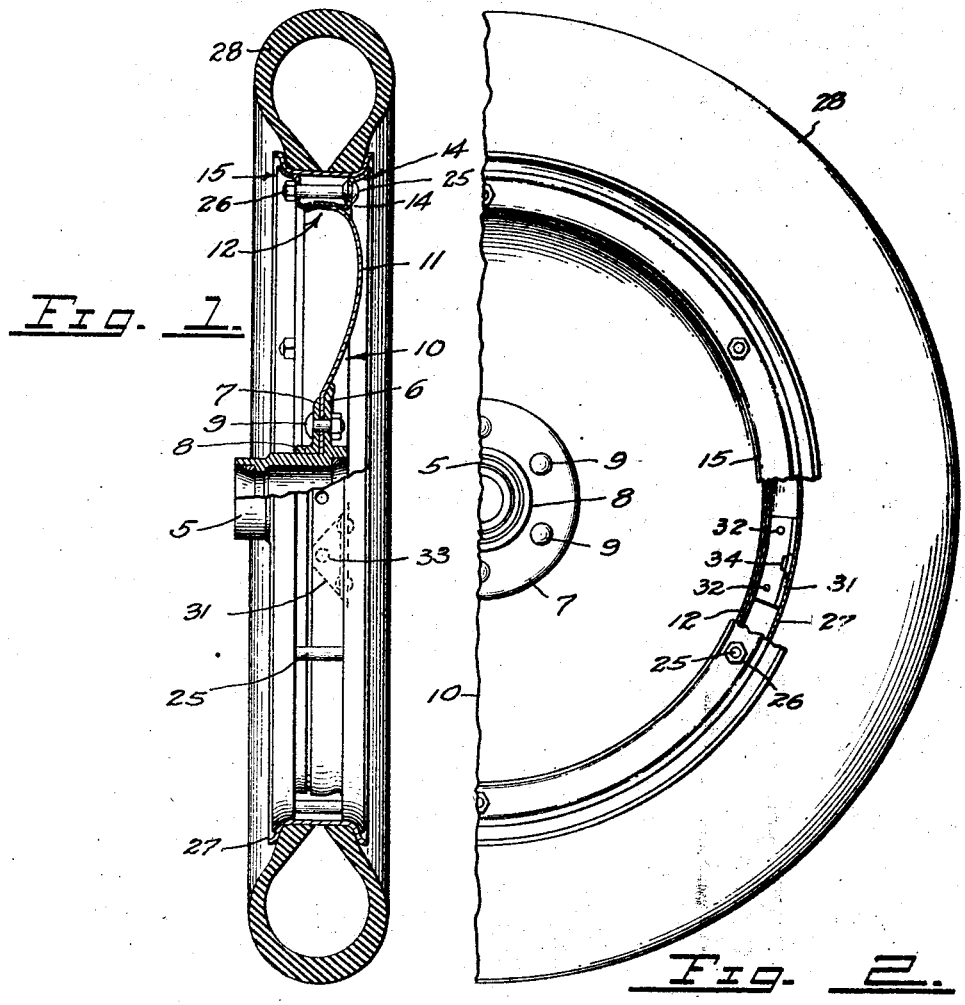
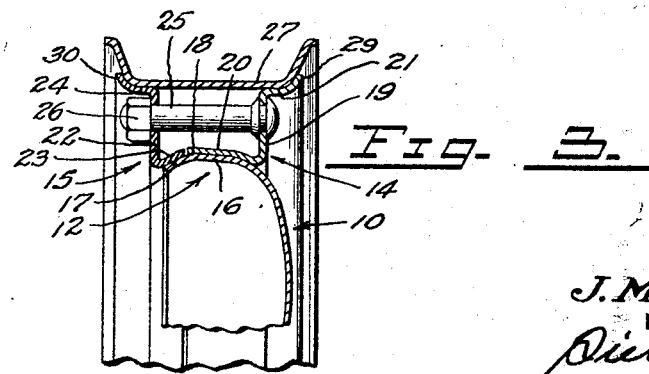
INVENTOR
J. M. Lindmark
BY
ATTORNEY Patented Dec. 8, 1925.

1,564,867

UNITED STATES PATENT OFFICE.

JOHN M. LINDMARK, OF SEATTLE, WASHINGTON.

VEHICLE WHEEL.

Application filed March 2, 1925. Serial No. 12,539.

*To all whom it may concern:*

Be it known that I, JOHN M. LINDMARK, a citizen of the United States, residing at Seattle, in the county of King and State of Washington, have invented certain new and useful Improvements in Vehicle Wheels, of which the following is a specification.

This invention relates to vehicle wheels of the disk type; and its object is to simplify and otherwise improve the wheel construction for the purpose of increasing its strength, durability and general efficiency.

The invention consists in the novel construction, adaptation, and combination of parts hereinafter described and claimed.

In the drawing,—

Figure 1 is a transverse section of a wheel embodying my invention; and Fig. 2 is an elevational view of a part of the wheel with portions broken away for the purpose of illustrating constructional details; Fig. 3 is a detail transverse section of a portion of the wheel illustrating the disk, felly and rim assembly to a larger scale than in the preceding views.

In said drawing, the reference numeral 5 respresents a wheel hub provided with a peripheral flange 6 which cooperates with the flanges 7 of a detachable ring 8 and with clamping bolts 9 for rigidly securing a disk 10 to the hub.

Said disk is, preferably, of pressed steel having a central plane portion between said flanges; outside of the flanges the disk is curved or bulged laterally, as at 11, and terminates in a peripheral flange 12 which is adapted to furnish a seat for a fixed felly section 14 and a demountable felly section 15.

As best shown in Fig. 3, the disk flange 12 is formed to provide two conoidal portions 16 and 17 which taper in opposite directions from a ridge 18 which is disposed circumferentially of the wheel, said tapering portions serving as seats for the respective felly sections. The felly section 14 is formed with a web element 19 disposed at right angles to the wheel axis, or nearly so, and has flange elements 20 and 21 extending in opposite directions as shown from the inner and outer peripheries, respectively of said web element.

The felly flange element 20 is of a conoidal shape corresponding to the shape of the disk flange portion 16 and to which it is rigidly secured by welding or otherwise.

Like the fixed felly section 14, the demountable felly section 15 is formed to provide a web element 22 having flange elements 23 and 24 extending from its inner and outer peripheries, respectively.

The inner flange of the felly section 15 is formed with a taper corresponding to the taper of the disk flange portion 17 to seat firmly thereupon. The demountable felly section 15 is detachably held in place as by means of screw threaded fastening bolts 25 which are secured to the web 19 of the fixed felly section and extend through apertures of web 22 of the demountable felly section to receive nuts 26 which engage against the same. The flanges 21 and 24 constitute spaced apart shoulder bearings for a demountable rim 27 which carries a tire, such as 28 for example.

The flanges 21 and 24, moreover, afford rim bearing seats having outwardly turned rim-retaining flanges 29 and 30.

31 represents a bracket secured as by rivets 32 to the fixed felly section and is provided with an aperture 33 to receive a rim protuberance 34 to prevent the turning of the rim relatively of the wheel structure.

It is to be noted that the present invention provides a construction employing a disk-flange which is formed with oppositely tapering seats for both the fixed and the removable felly sections.

The outer flanges 21 and 24 of the respective felly sections furnish cylindrical seating surfaces for the rim 27; and the bolts 25 and nuts 26 serve to couple the two felly sections together and cause the demountable section to seat firmly upon the portion 17 of the disk flange.

What I claim, is,—

1. In a disk wheel, a pair of felly members, each having a tapering inner peripheral surface and a curved outer peripheral surface, a disk having a peripheral flange formed upon its outer circumference with oppositely tapering seating surfaces for the respective felly members, one of said felly members being rigidly secured to said disk flange, means for removably securing the other of said felly members upon the disk flange, and a rim adapted to seat upon said curved surfaces of both of the felly members.

2. In a disk wheel, a disk having a circular flange formed to provide an outer peripheral surface having two portions tapering respectively toward the opposite sides of the flange, a demountable rim, a two part felly, each of the members of said felly having a tapering inner peripheral surface to seat upon the respective tapering portions of the surface of the disk flange, one of said felly members being rigidly secured upon one of the tapering portions of said flange surface, and means for removably securing the other felly member upon the other tapering portion of said flange surface.

3. In a disk wheel, a disk having a peripheral flange formed to provide intermediate its width a circumferentially disposed ridge and a felly-seating surface at each side of the ridge and tapering therefrom to the respective margins of the flange, two complementary felly members each having a web element and flange elements at the inner and outer peripheries respectively of its web element, the last named flanges being disposed at opposite sides of the respective web elements, the inner flange element of each felly member having interiorly thereof a tapering surface to engage upon the respective seating surfaces of the disk flange, the outer flange element of each felly member having a curved outer surface, one of said felly members being rigidly mounted upon the disk flange, and means for removably securing the other felly member upon the disk flange.

4. In a disk wheel, a disk having a circumferential flange formed with a tapering outer peripheral surface, a pair of felly members, one of said members being rigidly mounted upon the disk flange, the other felly member being removable and having a tapering inner surface adapted to seat upon the tapering surface of said flange, each of said felly members having a curved flange element, a rim adapted to seat upon the flange elements of both felly members, and means connected to both of said felly members for releasably securing the removable felly member upon the disk flange.

Signed at Seattle, Washington, this 28th day of January, 1925.

JOHN M LINDMARK.